United States Patent
Uytterhaeghe et al.

[11] Patent Number: 5,927,778
[45] Date of Patent: Jul. 27, 1999

[54] METHOD FOR MAKING A PART OF REINFORCED THERMOPLASTIC MATERIAL, A BUMPER BEAM, AND A BUMPER COMPRISING SUCH A BEAM

[76] Inventors: Luc Uytterhaeghe, 4 C. rue du Molard, 01100 Arbent; Francois Duboin, Place Jean Duvet, 52200 Langres; Thierry Roussel, 52500 Montesson; Emmanuel Matos, 3, rue de la Coutellerie, 52200 Langres, all of France

[21] Appl. No.: 08/874,326

[22] Filed: Jun. 13, 1997

[30] Foreign Application Priority Data

Jun. 13, 1996 [FR] France ................................ 96 07360

[51] Int. Cl.$^6$ .................... B29C 43/18; B60R 19/03
[52] U.S. Cl. ................ 293/120; 264/154; 264/163; 264/257; 264/325; 425/112
[58] Field of Search .................... 264/257, 258, 264/324, 325, 154, 156, 163; 425/120, 112, 129.1; 293/120, 121, 122, 132

[56] References Cited

U.S. PATENT DOCUMENTS

| | | | |
|---|---|---|---|
| 3,078,206 | 2/1963 | Skura . | |
| 3,196,490 | 7/1965 | Erb . | |
| 4,415,397 | 11/1983 | Wetzel . | |
| 5,034,076 | 7/1991 | Masui et al. ............................ | 264/257 |
| 5,089,206 | 2/1992 | Kia . | |
| 5,093,067 | 3/1992 | Gibson ................................. | 425/129.1 |
| 5,290,079 | 3/1994 | Syamal .................................. | 264/257 |
| 5,356,588 | 10/1994 | Hara et al. ............................. | 264/257 |
| 5,520,758 | 5/1996 | Kelman et al. ........................ | 264/258 |
| 5,672,309 | 9/1997 | Masui et al. ........................... | 264/324 |
| 5,770,134 | 6/1998 | Hara et al. ............................. | 264/257 |

FOREIGN PATENT DOCUMENTS

| | | |
|---|---|---|
| 0-241-359-A1 | 10/1987 | European Pat. Off. . |
| 0-255-314-A2 | 2/1988 | European Pat. Off. . |
| 0-266-742-A2 | 5/1988 | European Pat. Off. . |
| 0-332-899-A2 | 9/1989 | European Pat. Off. . |
| 0-547-625-A1 | 6/1993 | European Pat. Off. . |
| WO-85/00141 | 1/1985 | WIPO . |

*Primary Examiner*—Mathieu D. Vargot

[57] ABSTRACT

A device and method is provided for making a thermoplastic part reinforced by a reinforcing sheet on one of the faces of said part. The method includes using a mold having a main cavity that defines the general shape of the part and secondary cavities terminating at a wall of the main cavity and defining projections from one of the faces of the part; and placing in the open mold a reinforcing sheet comprised of a woven or bonded fabric of reinforcing fibers mixed with thermoplastic material, against said wall of the main cavity, the reinforcing sheet thus closing the openings of the secondary cavities. The method further includes introducing into the open mold a thermoplastic material, possibly containing fibers, into the main cavity of the mold on the side of the reinforcing sheet opposite the secondary cavities in a sufficient quantity to fill the main cavity and the secondary cavities; gradually closing the mold to cause the thermoplastic to flow and the main and secondary cavities to fill; and removing the part from the mold.

7 Claims, 5 Drawing Sheets

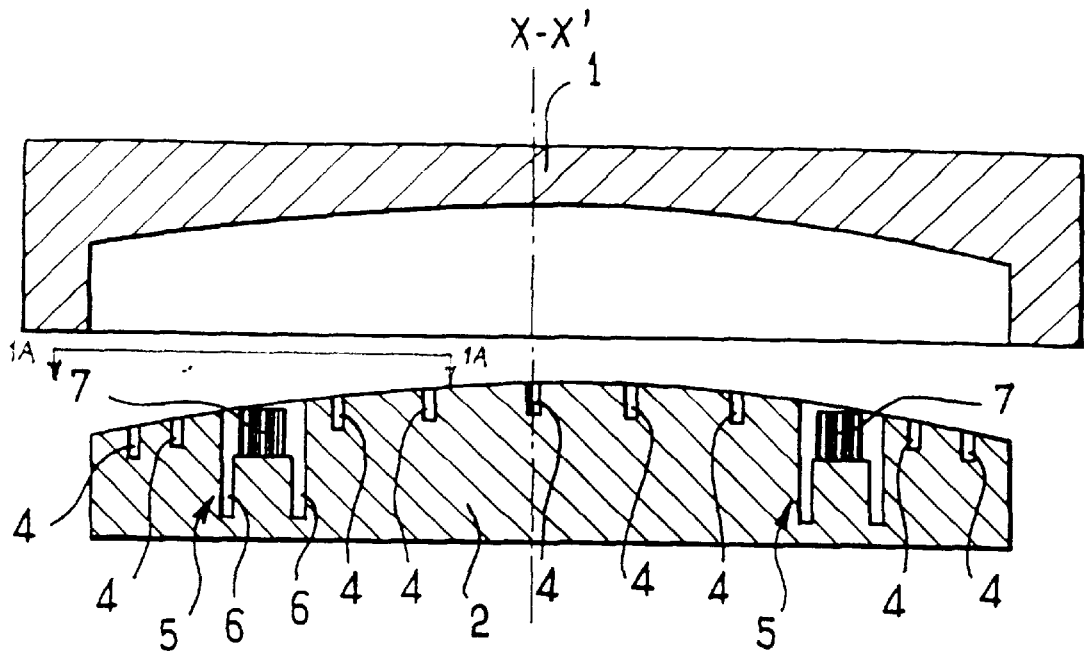
FIG_1
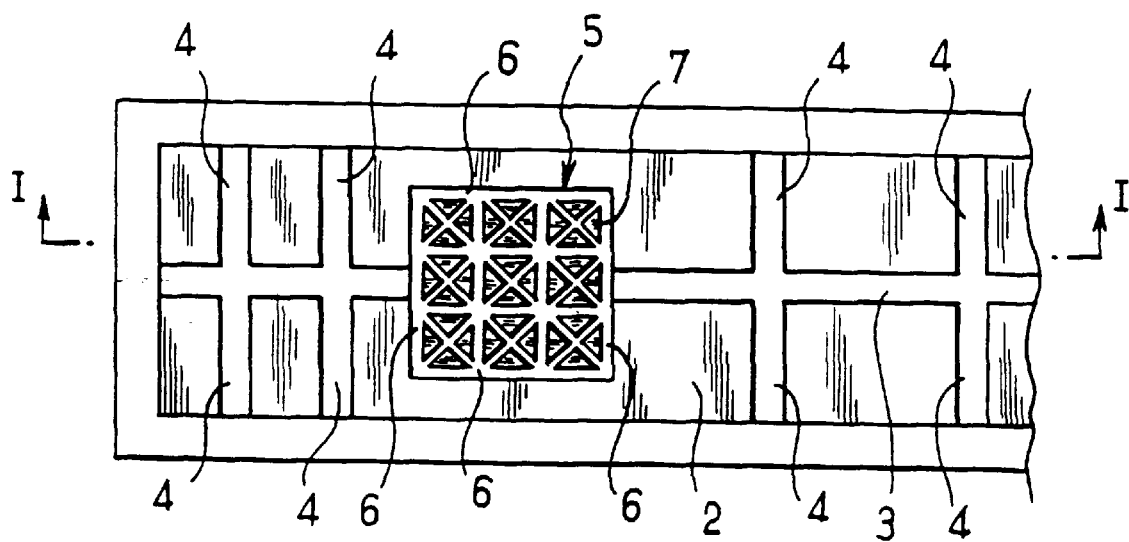
FIG_1A

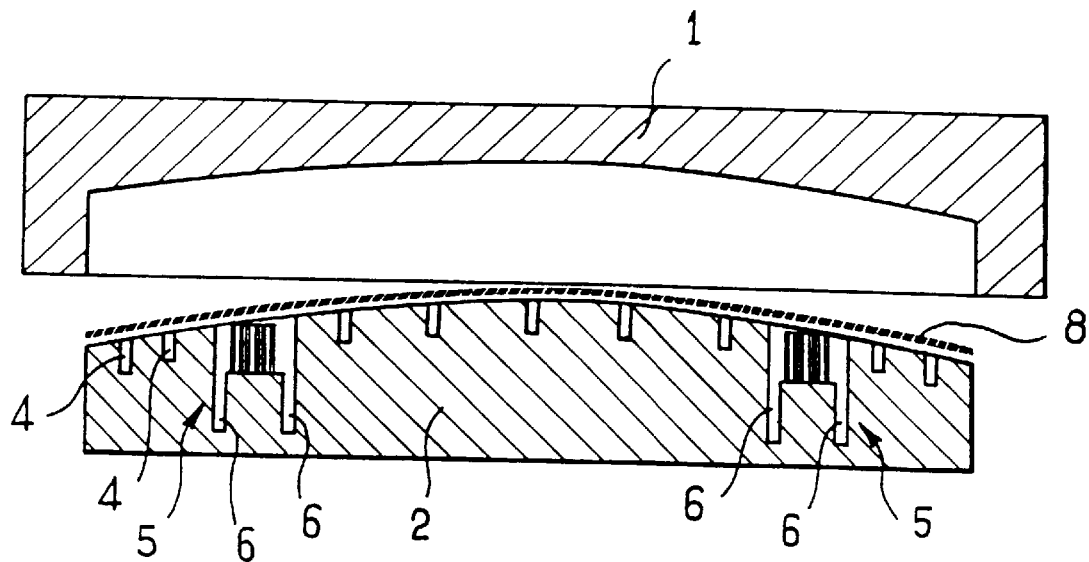
FIG_2
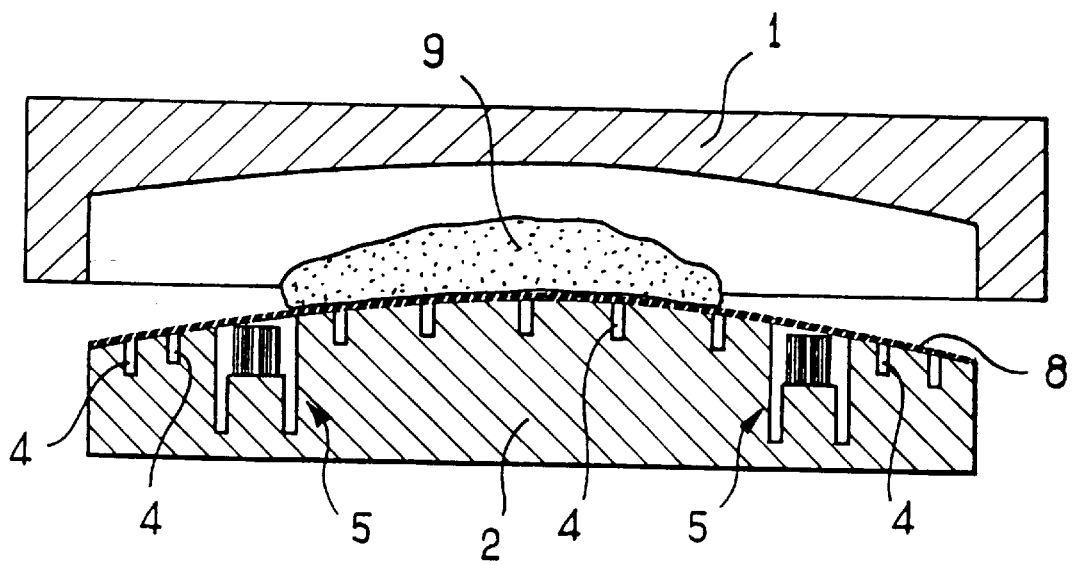
FIG_3

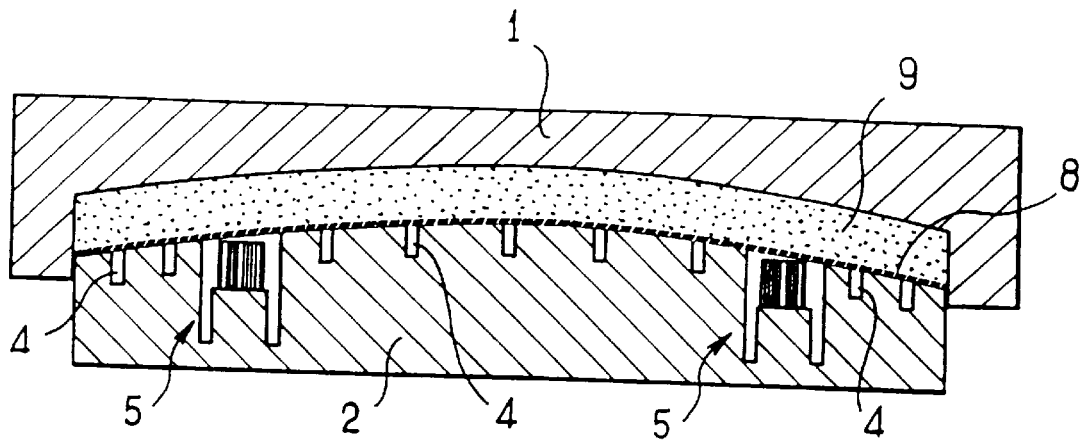
FIG_4
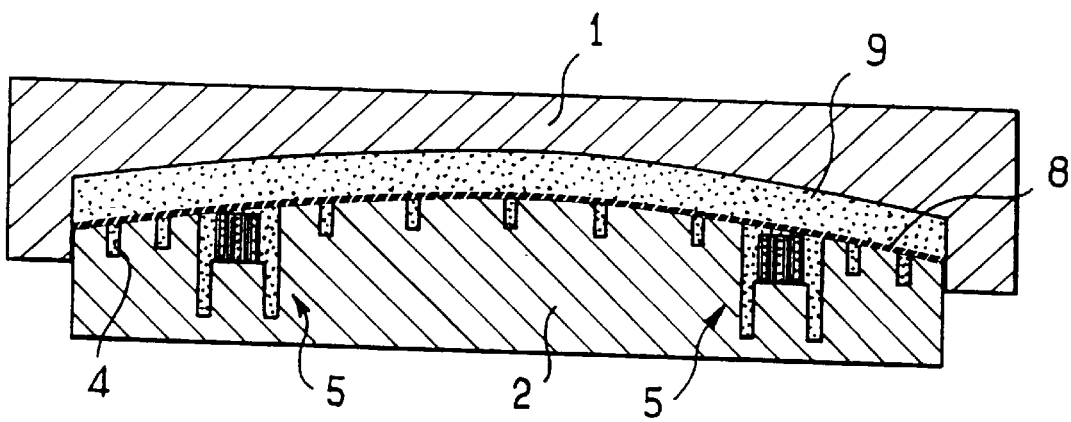
FIG_5

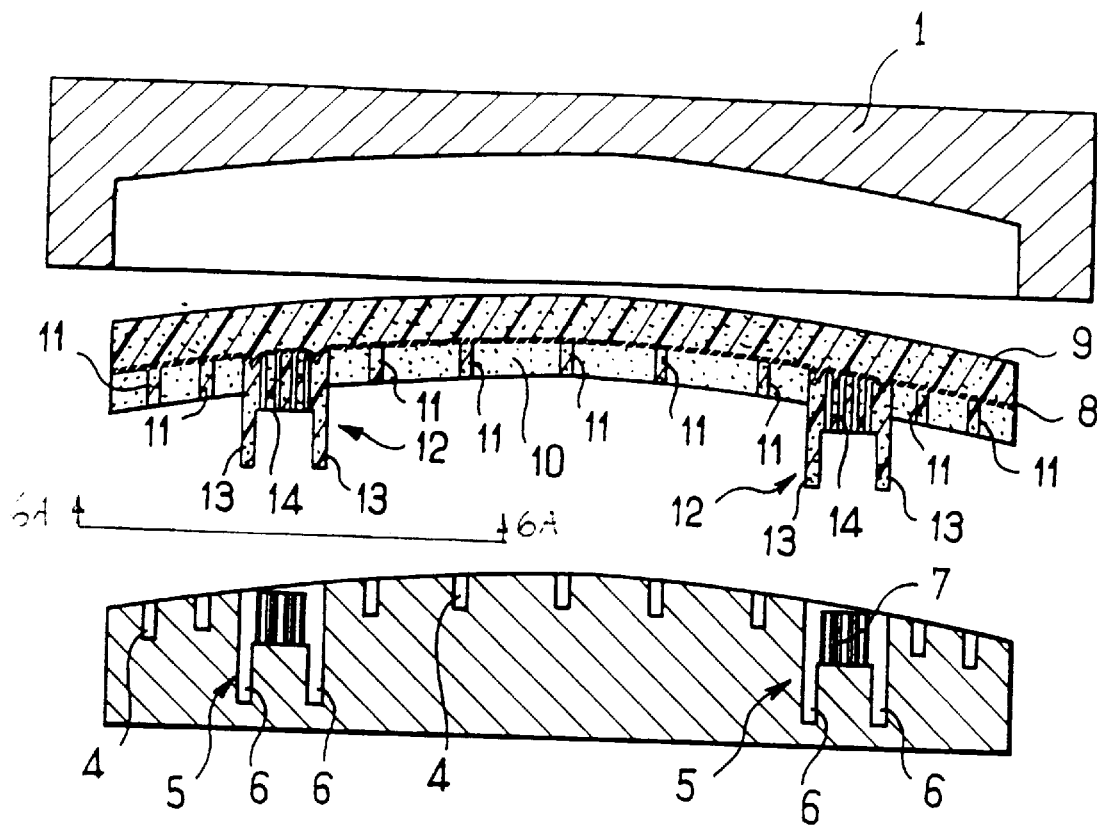
FIG_6
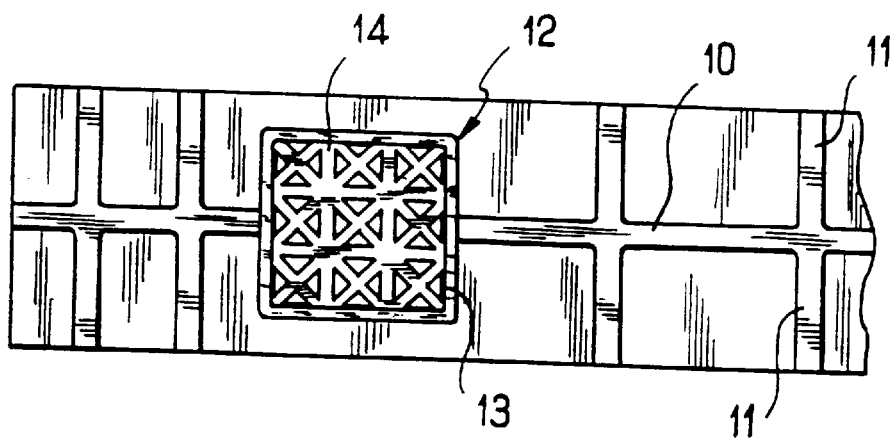
FIG_6A

METHOD FOR MAKING A PART OF REINFORCED THERMOPLASTIC MATERIAL, A BUMPER BEAM, AND A BUMPER COMPRISING SUCH A BEAM

BACKGROUND OF THE INVENTION

1. Field of Invention

The present invention relates to a method for making a reinforced thermoplastic part, a bumper beam, and a bumper comprising such a beam.

2. Description of Related Art

It is known that fastening elements need to be provided on a bumper beam to connect the beam to a stone deflector and to connect the beam to the vehicle chassis. When the beam is made of aluminum, these fastening elements must be joined.

It has already been proposed that a bumper beam be made of thermoplastic, possibly reinforced with fibers, so that not only can the weight of the beam be reduced but also the fastening elements can be cast into the beam, improving the economics of manufacturing and assembling fastening elements. However, despite the ribs with which they may be provided, these thermoplastic beams have the drawback of being insufficiently rigid.

To solve this rigidity problem, the idea was conceived of making a bumper beam of reinforced thermoplastic combined with one or more reinforcing sheets made of a woven or bonded fabric of reinforcing fibers, particularly glass, mixed with thermoplastic material, said thermoplastic being present in the form of fibers of thermoplastic materials such as the materials sold under the name "Twintex" by the Vetrotex Company or present in the form of impregnated reinforcing fibers as in the materials in the reinforced thermoplastic sheet (RTS) family. The reinforcing sheet is heated, then placed in a mold where it is overmolded by the thermoplastic material. It then matches the shape of the mold and, after removal, appears on one of the faces of the beam. The presence of the reinforcing sheet is very useful because it confers high rigidity on the beam. However, this reinforcing sheet occupies an entire face of the beam.

Despite its relative viscosity when hot, the reinforcing sheet has only limited deformability, which prevents it from penetrating into the ribs and deep, narrow cavities of the mold of the type used for making fastening elements. Thus, the ribs or fastening elements on the face of the beam occupied by the reinforcing sheet were no longer made by molding. While the absence of a rib on this face can be compensated more or less successfully by a slightly modified beam design, the absence of fastening elements molded together with the beam compels one to return to a traditional fastening system in which the elements are joined to the beam.

SUMMARY OF THE INVENTION

The goal of the present invention is to solve this problem by offering a molding method that allows ribs or fastening elements projecting from the face of the beam occupied by the reinforcing sheet to be formed. The present invention relates to a method for making a thermoplastic part reinforced by a reinforcing sheet located on one of the faces of said part. The method includes or consists of using a mold having a main cavity that defines the general shape of the part and secondary cavities terminating at a wall of the main cavity and defining projections on one of the faces of the part; placing in the open mold a reinforcing sheet comprised of a woven or bonded fabric of reinforcing fibers mixed with thermoplastic material against said wall of the main cavity, the reinforcing sheet thus closing the openings of the secondary cavities; introducing into the open mold a thermoplastic material, possibly containing fibers, into the main cavity of the mold on the side of the reinforcing sheet opposite the secondary cavities in a sufficient quantity to fill the main cavity and the secondary cavities; gradually closing the mold to cause the thermoplastic to flow and the main and secondary cavities to fill; and removing the part from the mold.

The method according to the invention is noteworthy in that, contrary to all expectations, the reinforcing sheet does not prevent the thermoplastic from flowing into the secondary cavities of the mold. Until the present time, since the reinforcing sheet was known to be incapable of matching the complex shapes of the mold, the reinforcing sheet was always applied to a wall of the main cavity that was relatively smooth. The thermoplastic material then bonded intimately with the preimpregnated fibers of the reinforcing sheet without passing through the latter. In experimental molding of such a reinforcing sheet for a new product, the inventors of the present invention unintentionally used a mold provided with secondary cavities and placed the reinforcing sheet on the openings of these secondary cavities. When the part was removed from the mold, they noted that the thermoplastic material had passed through the reinforcing sheet, which is surprising in view of the relatively low pressure to which the thermoplastic material is subjected when the mold closes and the material is compressed.

Indeed, while classical injection into a closed mold involves subjecting the thermoplastic material to a pressure of between 200 and 250 bars, compression involves subjecting the thermoplastic material to a pressure of between approximately 100 and 150 bars. Mechanical strength testing showed that the part is not especially fragile in the vicinity of the areas of the reinforcing sheet traversed by the thermoplastic material, which appears to indicate that this sheet has allowed thermoplastic material to pass through without tearing significantly, or in any event in such a way that any local damage to the reinforcing sheet does not adversely affect the mechanical properties of the part. On reflection, it appeared that the uniform action of the two parts of the mold forced together onto the thermoplastic material allows the pressure over the entire contact surface between the reinforcing sheet and the mass of thermoplastic material to be uniformly distributed, thus allowing the material to pass harmlessly through the reinforcing sheet.

According to the invention, the ability to form ribs on the face of the part occupied by the reinforcing sheet allows the two factors crucial for obtaining good rigidity of this part to be combined in a single part, said factors being presence of the reinforcing sheet and presence of ribs on the face of the part occupied by the reinforcing sheet. In one particular embodiment of the invention, one can benefit from the presence of ribs to reduce the thickness of the reinforcing sheet or the number of reinforcing sheets in the case where several reinforcing sheets are superimposed in a single part. As an example of a reinforcing sheet usable according to the invention, one may cite the thermoplastic preimpregnated material "Twintex" made by the Vetrotex Company, and the product "Tepex" made by the Du Pont de Nemours Company.

The present invention also relates to a bumper beam made by implementing the method described above and characterized in that, on its face opposite the stone deflector, the beam has a reinforcing sheet comprised of a woven or bonded fabric of reinforcing fibers mixed with the thermoplastic material and stiffening ribs projecting from the reinforcing sheet. In one particular embodiment of the invention, the bumper beam also has elements for fastening to the side rails of an automobile, said elements projecting from the face of the beam opposite the stone deflector.

In a preferred variant of this embodiment, one or more fastening element(s) is/are comprised of a cylindrical or prismatic containment enclosure such that said containment enclosure may have a circular or rectangular cross section, said containment enclosure being open on the side of the beam facing the vehicle's side rails, an impact-absorbing element being freely engaged in this containment enclosure to rest on both the side rails (or on an intermediate element linking said side rails) and on the wall of the beam located at the bottom of the containment enclosure. In this variant, the bumper beam reproduces the functional characteristics of an aluminum beam mounted on shock absorbers attached to the side rails of a vehicle.

The present invention also relates to an automobile bumper provided with a beam as described above.

BRIEF DESCRIPTION OF THE DRAWINGS

For better understanding of the invention, embodiments provided as nonlimiting examples will now be described with reference to the attached drawings wherein:

FIG. 1 is a cross section of a mold for implementing the method according to the invention;

FIG. 1A is a view along line 1A—1A in FIG. 1;

FIG. 2 is a view analogous to that of FIG. 1 after a reinforcing sheet has been deposited in the mold;

FIG. 3 is a view analogous to that of FIG. 2 after a quantity of thermoplastic material has been deposited in the mold;

FIG. 4 is a view analogous to that of FIG. 3 after partial closure of the mold;

FIG. 5 is a view analogous to that of FIG. 4 after total closure of the mold;

FIG. 6 is a view analogous to that of FIG. 5 after opening the mold and removing the beam;

FIG. 6A is a view along line 6A—6A in FIG. 6;

DETAILED DESCRIPTION OF PREFERRED EMBODIMENTS

Figure 7:
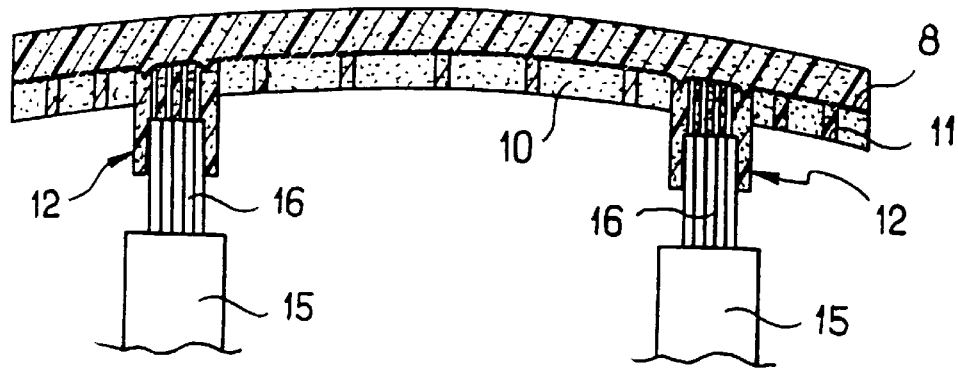
FIG. 7 is a cross-sectional view of the beam of FIG. 6 when used in an automobile.

The mold represented in the drawing has an upper part 1 and a lower part 2 between which a main cavity designed to mold a curved bumper beam. By displacement along an axis X–X', these two parts are able to interlock according to a positive joining plane, meaning that their coming together is not limited by any stop, this function being filled by the melted material introduced into the mold to create the beam.

With a view to clarity, the various secondary cavities which, in known fashion, allow supports for attaching the beam to a stone deflector to be molded simultaneously have not been shown in upper part 1. Lower part 2 of the mold has secondary cavities that all extend parallel to the opening or closing axis X–X', namely a lengthwise groove 3 and transverse grooves 4 which define ribs on the corresponding face of the beam. The lower part 2 of the mold also has two cavities 5 located symmetrically with respect to the median plane of the mold perpendicular to the drawing, at the points on the beam corresponding to the vehicle side rails. These cavities 5 are each comprised of four indentations 6 parallel to axis X–X' of the mold and square in cross section, as shown in FIG. 1A. Up to approximately half their depth, said indentations surround a set of plungers 7 which are parallel to the axis X–X' of the mold and each have a triangular section. The arrangement of plungers 7 is such that they form a grid.

According to the invention, the first step is to heat a reinforcing sheet 8 which is placed in the open mold on its lower part 2. Reinforcing sheet 8 thus covers secondary cavities 3, 4, and 5. As seen in FIG. 3, a mass of thermoplastic material, preferably containing fibers, is then placed on substantially the central part of the lower part 2 of the mold. The mold is then gradually closed. When closure occurs, thermoplastic material 9 is subjected to a pressure of approximately 100 bars and first flows into the main cavity of the mold as seen in FIG. 4. At this stage, the thermoplastic material 9 has not penetrated into cavities 3, 4, and 5.

The mold then continues to close, causing thermoplastic material 9 to pass through reinforcing sheet 8 at right angles to ribs 3, 4 and indentations 5. It can be seen that reinforcing sheet 8 does not tear when the thermoplastic material passes through. Thus, the mold is completely filled, as shown in FIG. 5. It then remains only to remove the beam thus obtained from the mold after opening it, as illustrated in FIG. 6.

Figure 8:
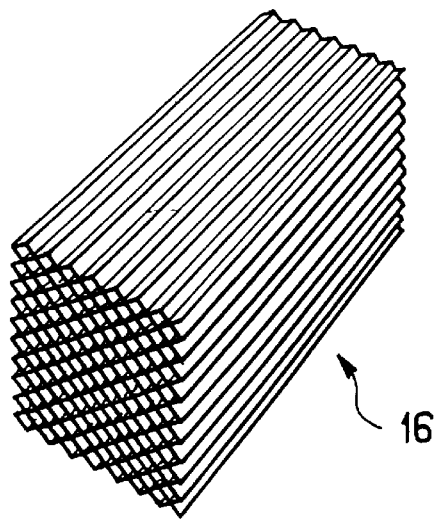
FIGS. 8 and 9 are perspective views of impact absorbers usable in the beam of FIG. 7.
Figure 9:
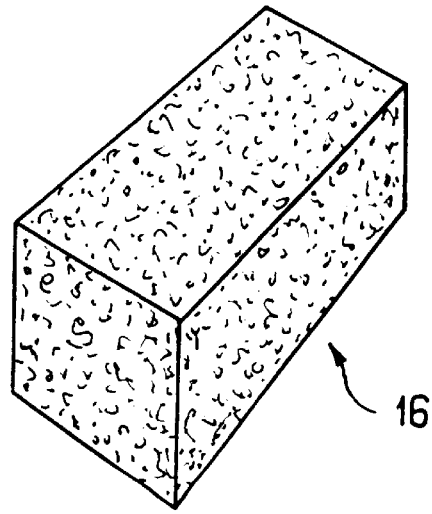

FIG. 6A shows the structure of the beam along line 6A—6A in FIG. 6. The beam has a lengthwise rib 10 and a plurality of cross ribs 11 as well as two containment enclosures with a square cross section formed by walls 13 molded in indentations 6. The containment enclosure is closed on the beam side by the ends of a grid 14 and open on its face opposite the beam. In its utilization illustrated by FIG. 7, the beam is applied against two side rails 15 of a vehicle (not shown) by means of two impact absorbers 16 with a slightly smaller cross section than that of containment enclosures 12, which are fit into these enclosures formed by walls 13. The impact absorbers usable for this purpose are, for example, a honeycomb parallelepipedic structure made of polycarbonate as shown in FIG. 8 or a block of PPE as shown in FIG. 9. Since impact absorbers 16 are held in containment enclosures 12 such that they function only in axial compression in the case of a head-on collision, they can completely fulfill their purpose.

In order to reinforce the structure of the beam, one can also provide a metal cross piece between the two containment enclosures to prevent them from spreading apart in a collision, said collision causing the beam to deform.

Other modifications of the embodiment just described may be made without thereby departing from the framework of the invention defined by the claims.

What is claimed is:

1. A method for making a bumper beam reinforced by a reinforcing sheet on a face of said bumper beam, comprising:

using a mold having a main cavity that defines the shape of the bumper beam and secondary cavities terminating at a wall of the main cavity and defining projections from one of the faces of the bumper beam;

placing in the mold when the mold is open a reinforcing sheet comprised of at least one of a woven and a bonded fabric of reinforcing fibers mixed with thermoplastic material against said wall of the main cavity, the reinforcing sheet closing openings of the secondary cavities;

introducing into the open mold a thermoplastic material into the main cavity of the mold on a side of the reinforcing sheet opposite the secondary cavities in a sufficient quantity to fill the main cavity and the secondary cavities;

gradually closing the mold to cause the thermoplastic material to flow and the main cavity and secondary cavities to fill, said thermoplastic material passing through said reinforcing sheet; and removing the bumper beam from the mold.

2. The method according to claim 1, wherein the thermoplastic material introduced into the mold contains fibers.

3. A bumper beam made by the method according to claim 1 comprising, on a face opposite a stone deflector of the bumper, a reinforcing sheet comprised of at least one of a woven and a bonded fabric of reinforcing fibers mixed with the thermoplastic material, and stiffening ribs projecting from said reinforcing sheet.

4. The bumper beam according to claim 3, comprising fastening elements that fasten to side rails of an automobile and that project from the side of the beam opposite the stone deflector.

5. The bumper beam according to claim 4, wherein at least one fastening element is comprised of a containment enclosure of at least one of cylindrical and prismatic shape open on the side of the beam facing the side rails of the automobile, an impact-absorbing element being freely engaged in this containment enclosure and connected to at least one of the side rails and an intermediate element linking therewith and positioned adjacent the wall of the beam located at the bottom of the containment enclosure.

6. An automobile bumper provided with a bumper beam according to claim 3.

7. A bumper beam reinforced by a reinforcing sheet on a face of said bumper beam made by the method according to claim 1 comprising, a reinforcing sheet comprised of at least one of a woven and a bonded fabric of reinforcing fibers mixed with the thermoplastic material, and projections projecting from said reinforcing sheet.

* * * * *

UNITED STATES PATENT AND TRADEMARK OFFICE
CERTIFICATE OF CORRECTION

PATENT NO. : 5,927,778
DATED : July 27, 1999
INVENTOR(S) : Luc Uytterhaeghe, Francois Duboin, Thierry Roussel & Emmanuel Matos It is certified that error appears in the above-identified patent and that said Letters Patent is hereby corrected as shown below:

On the title page item [73], insert
-- COMPAGNIE PLASTIC OMNIUM, LYON FRANCE --

Signed and Sealed this

Twenty-first Day of December, 1999

Attest:

Q. TODD DICKINSON

*Attesting Officer*  *Acting Commissioner of Patents and Trademarks*